(12) United States Patent
Werner et al.

(10) Patent No.: US 12,079,144 B1
(45) Date of Patent: Sep. 3, 2024

(54) ARBITRATION SUB-QUEUES FOR A MEMORY CIRCUIT

(71) Applicant: Apple Inc., Cupertino, CA (US)

(72) Inventors: Sebastian Werner, Mountain View, CA (US); Amir Kleen, Cupertino, CA (US); Jeonghee Shin, Sunnyvale, CA (US); Peter A. Lisherness, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/054,280

(22) Filed: Nov. 10, 2022

Related U.S. Application Data

(60) Provisional application No. 63/376,543, filed on Sep. 21, 2022.

(51) Int. Cl.
  *G06F 13/16* (2006.01)
  *G06F 13/374* (2006.01)

(52) U.S. Cl.
  CPC ........ *G06F 13/1642* (2013.01); *G06F 13/161* (2013.01); *G06F 13/1668* (2013.01); *G06F 13/374* (2013.01)

(58) Field of Classification Search
  None
  See application file for complete search history.

(56) References Cited

U.S. PATENT DOCUMENTS

| | | | |
|---|---|---|---|
| 5,191,649 A | 3/1993 | Cadambi et al. | |
| 5,237,567 A * | 8/1993 | Nay | G06F 13/374 370/438 |
| 5,375,215 A * | 12/1994 | Hanawa | G06F 13/1642 711/169 |
| 6,078,983 A * | 6/2000 | Hanawa | G06F 13/1605 710/242 |
| 6,295,586 B1 * | 9/2001 | Novak | G06F 13/1642 711/158 |
| 6,549,991 B1 * | 4/2003 | Huang | G06F 13/1626 711/158 |

(Continued)

OTHER PUBLICATIONS

Machine Translation of Chinese Patent Application CN 103870245 A, 2014. (Year: 2014).*

(Continued)

*Primary Examiner* — Steven G Snyder
(74) *Attorney, Agent, or Firm* — Kowert, Hood, Munyon, Rankin & Goetzel, P.C.; Scott W. Pape; Dean M. Munyon

(57) ABSTRACT

An apparatus includes a communication bus circuit, a memory circuit, a queue manager circuit, and an arbitration circuit. The communication bus circuit includes a command bus and a data bus separate from the command bus. The queue manager circuit may be configured to receive a first memory request and a second memory request, each request including a respective address value to be sent via the command bus. The first memory request may include a corresponding data operand to be sent via the data bus. The queue manager circuit may also be configured to distribute the first memory request and the second memory request among a plurality of bus queues. Distribution of the first and second memory requests may be based on the respective address values. The arbitration circuit may be configured to select a particular memory request from a particular one of the plurality of bus queues.

20 Claims, 8 Drawing Sheets

(56) References Cited

U.S. PATENT DOCUMENTS

| | | | | |
|---|---|---|---|---|
| 7,373,471 | B2 * | 5/2008 | Brittain | G06F 13/161 |
| | | | | 711/167 |
| 7,600,091 | B2 * | 10/2009 | Brittain | G06F 13/161 |
| | | | | 711/167 |
| 8,867,303 | B2 | 10/2014 | Hu et al. | |
| 9,323,285 | B2 | 4/2016 | Lewis | |
| 10,152,434 | B2 * | 12/2018 | Kyrychynskyi | G06F 13/4068 |
| 10,275,352 | B1 * | 4/2019 | Balakrishnan | G11C 16/0408 |
| 10,296,230 | B1 * | 5/2019 | Balakrishnan | G06F 3/0685 |
| 10,684,969 | B2 | 6/2020 | Magro et al. | |
| 10,846,253 | B2 * | 11/2020 | Shen | G06F 3/0659 |
| 10,949,121 | B2 | 3/2021 | Takano | |
| 11,467,988 | B1 * | 10/2022 | Hammarlund | G06F 12/0292 |
| 2006/0179213 | A1 * | 8/2006 | Brittain | G06F 13/161 |
| | | | | 711/105 |
| 2008/0091905 | A1 * | 4/2008 | Brittain | G06F 13/161 |
| | | | | 711/E12.001 |
| 2008/0159145 | A1 * | 7/2008 | Muthukrishnan | H04L 49/254 |
| | | | | 370/468 |
| 2018/0173649 | A1 * | 6/2018 | Kyrychynskyi | G06F 13/161 |
| 2021/0357336 | A1 * | 11/2021 | Shen | G06F 13/1668 |
| 2022/0121594 | A1 * | 4/2022 | Pappu | G06F 13/1668 |

OTHER PUBLICATIONS

Machine Translation of Japanese Patent Application JP 4184614 B2, 2008. (Year: 2008).*

* cited by examiner

400

Receiving, by a queue manager circuit in a particular circuit block of a plurality of circuit blocks in an integrated circuit, a first memory request and a second memory request to be sent via a communications bus circuit that includes a command bus and a data bus, separate from the command bus, wherein the first and second memory requests each include a respective address to be sent via the command bus, and wherein the first, but not the second, memory request includes a data operand to be sent via the data bus.
410

Selecting, by the queue manager circuit using the address of the first memory request, a particular one of a plurality of bus queues in the particular circuit block to store the first memory request.
420

Selecting, by an arbitration circuit based on a determination that the data bus is available, the first memory request from the particular bus queue.
430

Sending, by the queue manager circuit in a first bus cycle, the address of the first memory request via the command bus and at least a portion of the data operand via the data bus.
440

```
┌─────────────────────────────────────────────────────────────────┐
│ Identifying a set of memory requests, wherein a given memory    │
│ request of the set is at a front of a respective bus queue.     │
│                              510                                │
└─────────────────────────────────────────────────────────────────┘
                                │
                                ▼
┌─────────────────────────────────────────────────────────────────┐
│ Removing an ineligible memory request from the set in response  │
│ to determining that the ineligible memory request includes a    │
│ data operand and that the data bus is unavailable in a next     │
│ bus cycle.                                                      │
│                              520                                │
└─────────────────────────────────────────────────────────────────┘
                                │
                                ▼
┌─────────────────────────────────────────────────────────────────┐
│ Selecting, from the remaining queued memory requests of the     │
│ set, the next memory request.                                   │
│                              530                                │
└─────────────────────────────────────────────────────────────────┘
```

In response to selecting the first memory request from the particular bus queue, initializing a count value associated with the particular bus queue.
610

In response to selecting the first memory request from the particular bus queue, adjusting respective count values for one or more other bus queues in the plurality of bus queues.
620

Selecting, after the respective count values have been adjusted, a particular memory request from a given one of the one or more other bus queues using the respective count values.
630

*FIG. 6*

ARBITRATION SUB-QUEUES FOR A MEMORY CIRCUIT

PRIORITY CLAIM

The present application claims priority to U.S. Provisional App. No. 63/376,543, entitled "Arbitration Sub-Queues for a Memory Circuit," filed Sep. 21, 2022, the disclosure of which is incorporated by reference herein in its entirety.

BACKGROUND

Technical Field

Embodiments described herein are related to computing systems, including systems-on-a-chip (SoCs). More particularly, embodiments are disclosed to techniques for managing memory request queues on an SoC.

Description of the Related Art

Integrated circuit (IC) design, including system-on-a-chip (SoC) design, may utilize communication bus circuits to transfer memory requests from processing circuits (e.g., processor cores, graphics processing units, networking circuits, and the like) to memory circuits. Memory request may include read requests that include a read command and a source address identifying a memory location to read. Memory request may also include write requests that include a write command, a data operand, and a destination address identifying a memory location for storing the data operand. Some communication bus circuits may include separate command and data buses. A command bus may be used to transfer a command and address from a processing circuit to the memory circuit, while the data bus may be used to transfer write data from the processing circuit to the memory circuit as well as transfer read data from the memory circuit to the processing circuit.

A circuit block such as a graphics processing unit may generate a number of memory requests faster than the memory circuit can process the requests. To manage the memory requests until they can be sent, the processing circuit may include a bus queue to store requests in an order they are generated. A memory request at the top of the queue is selected and transferred to the memory circuit when the communication bus has an available bus cycle. Some write requests may include a data operand that includes more data than can be transferred in a single bus cycle, resulting in the data bus being unavailable for two or more consecutive bus cycles. If a read request follows a write request that uses the data bus for two or more bus cycles, then the read request may be transferred when the commend bus is available but the data bus is unavailable. A write request, however, may wait until both the command and data buses are available.

BRIEF DESCRIPTION OF THE DRAWINGS

The following detailed description makes reference to the accompanying drawings, which are now briefly described.

FIG. 4 illustrates a flow diagram of an embodiment of a method for managing a memory request queue for access to a communication bus circuit.

FIG. 5 shows a flow diagram of an embodiment of a method for selecting a next memory request to transfer across a communication bus circuit.

FIG. 6 depicts a flow diagram of an embodiment of a method for implementing a least-recently granted technique for selecting a bus queue from which to retrieve a next memory request to transfer across a communication bus circuit.

Figure 1:
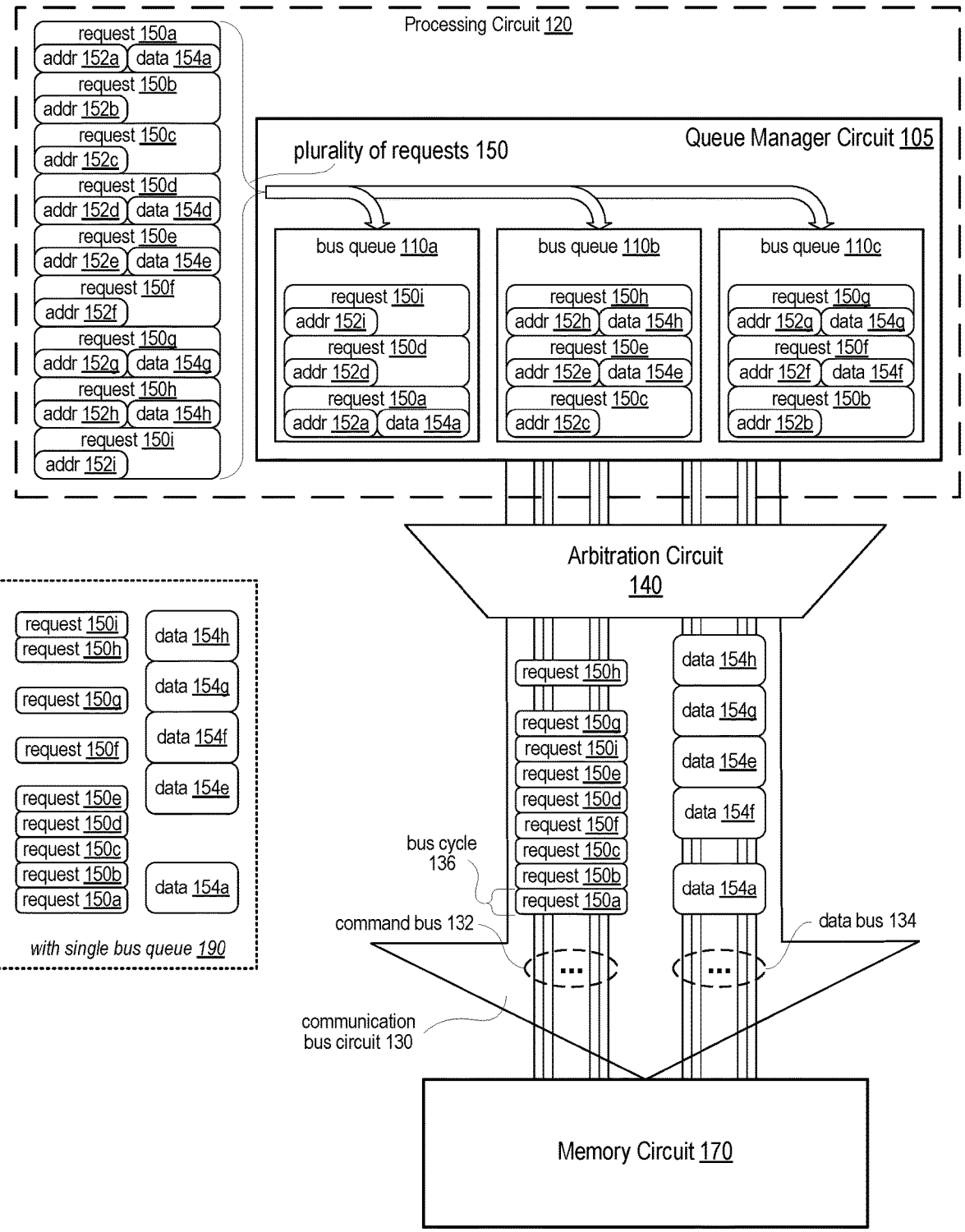
FIG. 1 illustrates a block diagram of an embodiment of an integrated circuit that includes a processing circuit, a communication bus circuit, and a memory circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

An integrated circuit (IC) may include a plurality of processing circuits that access a memory circuit using memory requests sent, via a communication bus, to read from and write to locations in the memory circuit. An arbitration circuit may be used to manage access to the communication bus by the plurality of processing circuits in a manner that provides suitable access for each processing circuit. In some embodiments, access to the communication bus may create a bottleneck for accessing the memory circuit, particularly if a series of write requests generates a backlog for the data bus. Accordingly, it may be desired to enable processing circuits to mix an adequate number of read requests with write requests such that the communication bus can utilize the command bus if the data bus is occupied with a large data operand from a write request.

The present disclosure considers novel circuits for use in an IC to manage bus queues used to buffer memory requests to be sent from a processing circuit to a memory circuit. An example apparatus (e.g., an IC) may include a communication bus circuit that includes a command bus and a data bus that is separate from the command bus. This apparatus may further include a memory circuit that is coupled to the communication bus circuit, and a queue manager circuit that is coupled to the communication bus circuit. The queue manager circuit may include a plurality of bus queues, and may be configured to receive a first memory request and a second memory request, each request including a respective address value to be sent via the command bus. The first, but not the second, memory request may further include a corresponding data operand to be sent via the data bus. The queue manager circuit may be further configured to distribute the first memory request and the second memory request among the plurality of bus queues. Distribution of the first and second memory requests may be based on the respective address values included in each of the requests. The apparatus may also include an arbitration circuit that is configured to select, based on whether the data bus is available, a particular memory request from a particular one of the plurality of bus queues.

By distributing memory requests from a particular processing circuit over a plurality of bus queues rather than placing them in a single bus queue for the processing circuit, chances of having a mix of read and write requests at a top of respective ones of the queues may increase. With a greater mix of memory requests available for selection to transfer across the communication bus, an increased ability is achieved to balance the memory requests, thereby reducing a number of cycles during which a command portion or data portion of the communication bus is idle. An increased efficiency of the communication bus may translate to increased performance of the processing circuits, and therefore, increased performance of the IC as a whole.

FIG. 1 illustrates a block diagram of an embodiment of an IC that uses an arbitration circuit to select memory requests to transfer from a processing circuit to a memory circuit via a communication bus circuit. Integrated circuit 100 includes processing circuit 120, communication bus circuit 130, arbitration circuit 140, and memory circuit 170. Processing circuit 120 further includes queue manager circuit 105 which, in turn, includes a plurality of bus queues 110a-110c (collectively 110). In some embodiments, integrated circuit 100 may be a part of a computing system, such as a desktop or laptop computer, a smartphone, a tablet computer, a wearable smart device, or the like.

As illustrated, integrated circuit 100 includes communication bus circuit 130 for transferring memory requests, including requests 150a-150i (collectively, plurality of requests 150), from processing circuit 120 to memory circuit 170. Communication bus circuit 130 includes command bus 132 and data bus 134. Command bus 132 is configured to transfer a command and address portion of ones of the plurality of requests 150 while data bus 134, which is separate from command bus 132, is configured to transfer a data portion of ones of the plurality of requests 150 that include data operands.

Plurality of requests 150, as shown, includes a variety of requests for memory circuit 170. Each of plurality of requests 150 includes a respective address 152a-152i (collectively 152). A portion of plurality of requests 150 include data operands. Requests 150a, 150d, 150e, 150g, and 150h may include write commands that include, respectively, data 154a, 154d, 154e, 154g, and 154h (collectively data 154). Each of data 154 may include any suitable amount of information to be stored in memory circuit 170. For simplicity in the present example, each data 154 includes an amount of information that requires two bus cycles of communication bus circuit 130 to transfer. In some embodiments, the requests without data operands, requests 150b, 150c, 150f, and 150i, may include read commands, status and control commands, or write commands with an inherent data operand (e.g., a command to clear a destination memory location).

As illustrated, memory circuit 170 is coupled to communication bus circuit 130 and is configured to store information in respective memory locations within one or more memory arrays (not shown) included within memory circuit 170. Memory circuit 170 may include any suitable number and types of memory arrays. For example, memory circuit 170 may include static random-access memory (SRAM), dynamic random-access memory (DRAM), flash memory, registers, magnetoresistive random-access memory (MRAM), and the like. In various embodiments, memory arrays may be located within integrated circuit 100, external to integrated circuit 100, or a combination thereof. For example, memory circuit 170 may include one or more memory controllers that are configured to access respective memory arrays that are either on-chip or off-chip. In an example embodiment, memory circuit 170 includes two memory controllers configured to access respective DRAM modules that are located off-chip from integrated circuit 100.

Queue manager circuit 105, as shown, is coupled to communication bus circuit 130 and is configured to receive request 150a and request 150b, each including a respective address value (addr 152a and 152b) to be sent via command bus 132. Request 150a, but not request 150b, includes a corresponding data operand (data 154a) to be sent via data bus 134. For example, request 150a is a write request to store data 154a at a starting memory location in memory circuit 170 as indicated by address (addr) 152a. Request 150b may be a read request to retrieve information stored at a memory location in memory circuit 170 as indicated by address (addr) 152b.

As depicted, queue manager circuit 105 is further configured to distribute requests 150a and 150b among bus queues 110. This distribution of requests 150a and 150b may be based on address 152a and 152b. Queue manager circuit 105 may use all or a part of addresses 152a and 152b to map request 150a and 150b into particular ones of bus queues 110. For example, queue manager circuit 105 may use bits four through eleven of the respective address values as an eight-bit value, and perform a hash or other function on the eight-bit value, and then map ranges of the result into the three bus queues 110. In the present example, queue manager circuit 105 places request 150a into bus queue 110a while request 150b is placed into bus queue 110c. Queue manager circuit 105 further receives requests 150c-150i and, as described, places each request into one of bus queues 110 based on values of respective addresses 152c-152i, with the results as shown.

Arbitration circuit 140, as illustrated, is configured to select, based on whether data bus 134 is available, a particular one of plurality of requests 150 from a particular one of bus queues 110. To perform the selection, arbitration circuit 140 may be configured to identify a set of requests, wherein a given request of the set is at the front of a respective one of bus queues 110. As shown, request 150a, 150c, and 150b are initially at the front of bus queues 110a, 110b, and 110c, respectively. Arbitration circuit 140 may determine whether requests in the set of requests are currently eligible to use communication bus circuit 130. As used herein, "eligible" to use the communication bus circuit refers to a request that is capable of being transferred via communication bus circuit 130 in a next bus cycle. Accordingly, a request that does not have a data operand may be eligible to use communication bus circuit 130 whenever command bus 132 is available. In contrast, a request that has a data operand may be eligible only if data bus 134 is available, and would otherwise be ineligible.

In some embodiments, eligibility may be prioritized for requests with data operands when data bus 134 is available. For example, for bus cycle 136, data bus 134 is available, so requests 150b and 150c, which do not have data operands, may be treated as ineligible, allowing request 150a, including data 154a, to be selected. If, however, a request is not available with a data operand, then requests without operands may be considered eligible. In other embodiments, arbitration circuit 140 may use any suitable technique for selecting a request from the set of eligible requests.

As shown, arbitration circuit 140 is further configured to select request 150a from the set of requests after determining that request 150a is eligible based on a determination that request 150a includes data 154a to send on data bus 134 and that data bus 134 is available to send at least a portion of data 154a in bus cycle 136. In a subsequent bus cycle, data bus 134 is unavailable as data 154a is too large to be sent in a single bus cycle. While data bus 134 continues to transfer data 154a in the subsequent bus cycle, arbitration circuit 140 is configured to select a next request from the request that are now at the fronts of the respective bus queues 110, e.g., request 150b, 150c, and 150d. Since a request was just selected from bus queue 110a, arbitration circuit 140 may use a round-robin, a least-recently granted, or any other suitable technique to determine if either bus queue 110b or 110c has a request that is eligible to use communication bus circuit 130 while data bus 134 is unavailable. Since both request 150b and 150c are eligible, one is selected (request 150b) and sent in the subsequent bus cycle.

This process repeats, sending plurality of requests 150 to memory circuit 170 via communication bus circuit 130 with a greater efficiency than if a single bus queue were used. As can be seen, the transfer of all of plurality of requests 150 with a single open bus cycle on data bus 134 while request 150c is transferred. Two open bus cycles on command bus 132 occur while data 154g and 154h are sent. It is noted, however, that a subsequent request without a data operand could be sent, if available, while a second portion of data 154h is sent. In comparison, an example 190 is illustrated in which all of the plurality of requests 150 are sent via a single bus queue in an order in which the requests are received. As shown, data bus 134 is idle for two bus cycles while requests 150c and 150d are sent. Command bus 132 is idle for three bus cycles while data 154e, 154f, and 154g are sent. In addition, since request 150i is sent while the second portion of data 154h is sent, there is not an opportunity for a subsequently received request to fill any of the idle command cycles.

Accordingly, it is noted that by utilizing a plurality of bus queues 110 within processing circuit 120, arbitration circuit 140 is capable of selecting requests to send via communication bus circuit 130 in a more efficient manner. More efficient use of communication bus circuit 130 may reduce an amount of time used to process memory requests and improve performance of processing circuit 120.

It is also noted that integrated circuit 100, as illustrated in FIG. 1, is merely an example. Integrated circuit 100 has been simplified to highlight features relevant to this disclosure. Elements not used to describe the details of the disclosed concepts have been omitted. For example, integrated circuit 100 may include various additional circuits that are not illustrated, such as one or more power management circuits, clock management circuits, other processing circuits, and the like. Although three bus queues are shown in processing circuit 120, any suitable number of bus queues may be included. The various data 154 are shown as taking two bus cycles to be transferred. In other embodiments, however, an amount of data in each data 154 may differ and may include any suitable amount of data for a given request. In various embodiments, queue manager circuit 105, arbitration circuit 140, communication bus circuit 130, and other circuits of integrated circuit 100 may be implemented using any suitable combination of sequential and combinatorial logic circuits. In addition, register and/or memory circuits, such as static random-access memory (SRAM) may be used in these circuits to temporarily hold information such as instructions, fetch parameters, and/or address values.

In FIG. 1, an integrated circuit with a single processing circuit is shown. Such circuit blocks may include circuitry for performing any of a wide variety of functions. In other embodiments, additional processing circuits may be included and may share a common communication bus. Various types of integrated circuits may utilize the disclosed techniques. An example of an integrated circuit with a plurality of processing circuits is depicted in FIG. 2.

Figure 2:
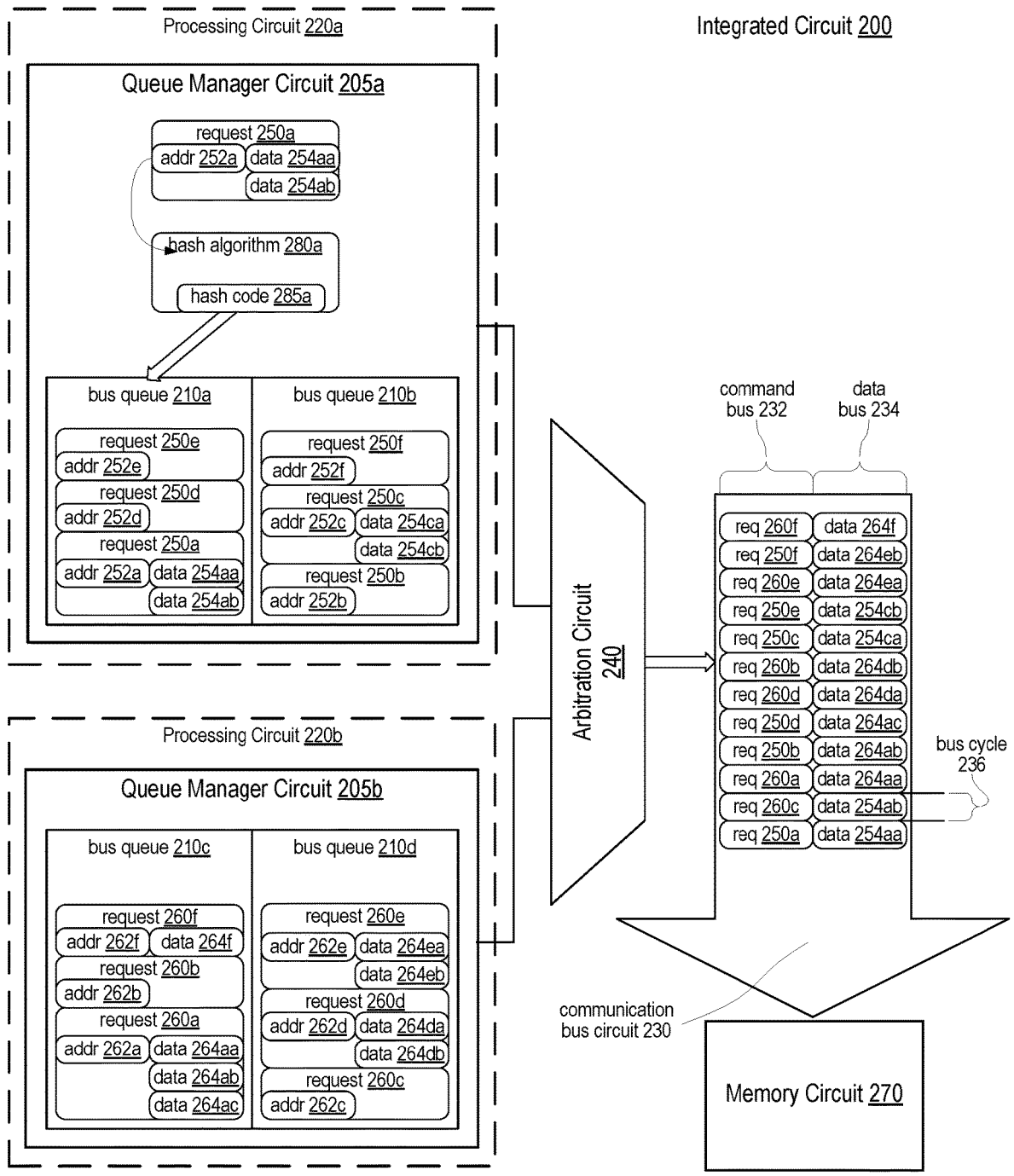
FIG. 2 shows a block diagram of an embodiment of an integrated circuit that includes a plurality of processing circuits and a communication bus circuit.

Moving to FIG. 2, a block diagram of an embodiment of an integrated circuit with two processing circuits as well as an arbitration circuit for accessing a communication bus is shown. Integrated circuit 200 includes processing circuits 220a and 220b (collectively 220), communication bus circuit 230, arbitration circuit 240, and memory circuit 270. Each of processing circuits 220 includes a respective one of queue manager circuits 205a and 205b. Each queue manager circuit 205 includes a respective two of the four bus queues 210a-210d. Integrated circuit 200, like integrated circuit 100, may be a part of a computing system, such as a desktop or laptop computer, a smartphone, a tablet computer, a wearable smart device, or the like.

In a similar manner as for integrated circuit 100 of FIG. 1, integrated circuit 200 includes communication bus circuit 230 for transferring respective requests (e.g., requests 250a-250f and requests 260a-260f) from processing circuit 220a and processing circuit 220b to memory circuit 270. As shown, communication bus circuit 230 includes command bus 232 and data bus 234 that is separate from command bus 232. Memory circuit 270 is coupled to communication bus circuit 230.

Integrated circuit 200 includes a plurality of queue manager circuits 205 that are coupled to communication bus circuit 230. As illustrated, processing circuit 220a includes queue manager circuit 205a that includes bus queues 210a and 210b that are, in turn, configured to hold requests 250a-250f (collectively 250). Similarly, processing circuit 220b includes queue manager circuit 205b that includes bus queues 210c and 210d that are, in turn, configured to hold requests 260a-260f (collectively 260). These queued requests 250 and 260 are to be sent via communication bus circuit 230 to memory circuit 270.

Queue manager circuit 205a is configured, as shown, to receive a first memory request and a second memory request (e.g., requests 250a and 250b), each including a respective address value (addrs 252a and 252b) to be sent via command bus 232. Request 250a, but not request 250b, includes a corresponding data operand (including data 254aa and 254ab) to be sent via data bus 234. Queue manager circuit 205a is further configured to assign requests 250a and 250b to respective ones of bus queues 210a and 210b. Queue manager circuit 205b is similarly configured to receive requests 260a and 260b and assign these received requests to respective ones of bus queues 210c and 210d. Assignments of requests 250 and 260 are based on the respective addresses 252.

To assign requests 250a and 250b to bus queues 210a and 210b, queue manager circuit 205a is further configured to select bus queue 210a for request 250a using a destination address (address 252a) of a first memory location of memory circuit 270 to which at least a portion of the corresponding data 254a is to be written. Bus queue 210b is similarly selected for request 250b using a source address (252b) of a second memory location of memory circuit 270 from which information is to be read. For example, queue manager circuit 205a may be configured to generate, for request 250a, hash code 285a of address 252a, and then select bus queue 210a using hash code 285a. Similarly, bus queue 210*b* is selected for request 250*b* based on a hash code generated using hash algorithm 280*a* on address 252*b*. Hash algorithm 280*a* may be operable to generate a hash code from all or a portion of a respective address 252. Hash codes may be mapped to respective bus queues 210*a* and 210*b* based the value of the respective hash code. For example, a particular range of hash codes may map to bus queue 210*a* and a different, non-overlapping, range maps to bus queue 210*b*. Hash algorithm 280 may be implemented to generate values into each range equally, such that consecutive address values may map to different bus queues 210. Queue manager circuit 205*b* is configured to distribute requests 260*a* and 260*b* in a similar fashion using a respective hash algorithm that may be the same as hash algorithm 280*a* or, in some embodiments, may differ to produce a different distribution than hash algorithm 280*a*.

As illustrated, arbitration circuit 240 is configured to select, from queue manager circuits 205*a* and 205*b*, a next request to transfer via communication bus circuit 230. To select the next request to transfer, arbitration circuit 240 is further configured to identify a set of queued requests by selecting requests that are at a front of a respective bus queue 210. After requests 250 have been distributed among bus queues 210*a* and 210*b* and requests 260 have been distributed among bus queues 210*c* and 210*d*, arbitration circuit 240 is configured to identify request 250*a*, 250*b*, 260*a*, and 260*c* as the four requests that are at the front of each of bus queues 210*a*, 210*b*, 210*c*, and 210*d*, respectively. In some embodiments, if data bus 234 is available for a next bus cycle, then arbitration circuit 240 may prioritize requests 250*a* and 260*a* that have data operands that require use of data bus 234. In other embodiments, arbitration circuit 240 may use any suitable arbitration technique, such as round-robin or least-recently granted, to give each of the four requests an equal chance at being selected. As shown, request 250*a* from bus queue 210*a* is selected, and a command portion of request 250*a* (including address 252*a*) is sent via command bus 232 while a first portion of the data operand (data 254*aa*) is sent via data bus 234.

In the subsequent bus cycle 236, data bus 234 sends a second portion of the data operand of request 250*a* (e.g., data 254*ab*). In response to a determination that data bus 234 is unavailable in bus cycle 236, arbitration circuit 240 may remove, from the set of requests at the front of the respective bus queues 210, ones of the queued memory requests that include a data operand. For example, after request 250*a* is selected, request 250*d* moves to the front of bus queue 210*a*. Requests 250*b*, 260*a*, and 260*c* remain at the front of bus queues 210*b*-210*c* since they have yet to be selected. Since request 260*a* includes a data operand (data 264*aa*-264*ac*) request 260*a* is removed from consideration for selection in bus cycle 236. Request 260*a*, however, remains at the front of bus queue 210*c* and is not de-queued or replaced within bus queue 210*c*. Arbitration circuit 240 is further configured to select, from the remaining requests of the set (250*b*, 250*d*, and 260*c*), the next request. As shown, request 260*c* is selected and is sent via command bus 232 during bus cycle 236.

Arbitration circuit 240 is further configured, in a bus cycle after bus cycle 236, to identify a refreshed set of queued requests at the fronts of bus queues 210. Since request 260*c* was selected, request 260*d* is now at the front of bus queue 210*d*. The set of requests now includes requests 250*d*, 250*b*, 260*a*, and 260*d* at the fronts of bus queues 210*a*-210*d*, respectively. In response to a determination that data bus 234 is available in the following bus cycle, arbitration circuit 240 may be further configured to select one of the queued requests in the refreshed set that has a data operand. Requests 260*a* and 260*d* have data operands while requests 250*b* and 250*d* do not. To increase efficiency of data bus 234, arbitration circuit 240 is configured to select one of request 260*a* and 260*d*. Arbitration circuit 240 may use a least-recently granted algorithm to select between the respective bus queues 210*c* and 210*d*. Since request 260*c* was selected from bus queue 210*d*, bus queue 210*c* is the queue that has been least-recently granted access to communication bus circuit 230. Accordingly, arbitration circuit 240 is configured to select request 260*a* from bus queue 210*c*. This process may continue for as long as at least one of bus queues 210 has a request queued.

It is noted that the example shown in FIG. 2 is associated with one depiction of an integrated circuit with a plurality of processing circuits. In other embodiments, any suitable number of processing circuits may be included. In addition, although only a single communication bus circuit 230 is included, additional bus circuits may be included in other embodiments. For example, integrated circuit 200 may include two memory controllers for performing respective memory requests. In such embodiments, a respective communication bus circuit may be used for each memory controller.

In the descriptions of FIGS. 1 and 2, techniques for selecting a request to be sent via a communication bus are disclosed. Selection of requests from a plurality of bus queues may be performed using a variety of techniques. Two techniques that may be utilized when selecting requests are shown in FIG. 3.

Figure 3:
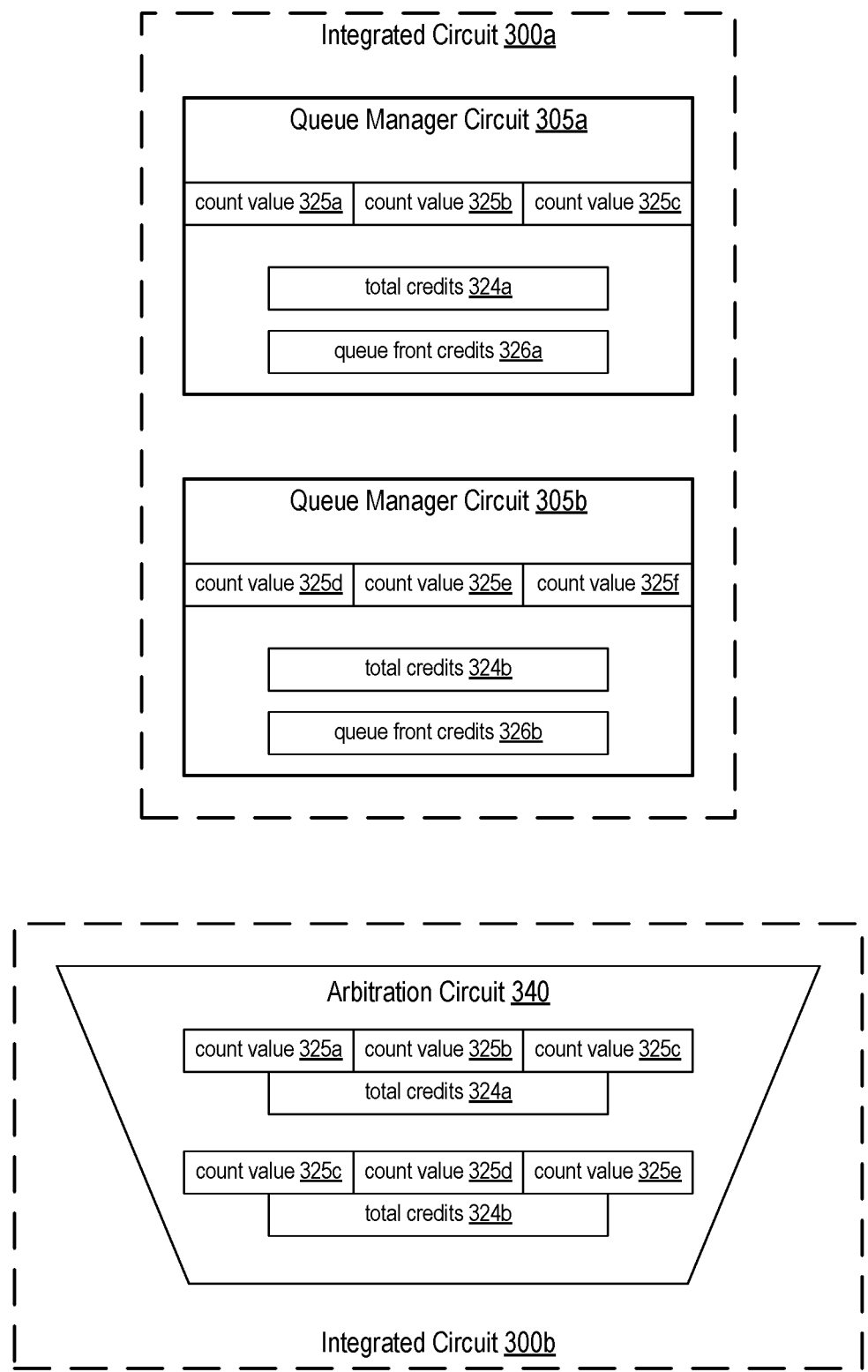
FIG. 3 depicts a block diagram including two embodiments of an integrated circuit.

Turning to FIG. 3, block diagrams of two embodiments of an integrated circuit that tracks least-recently granted bus queues as well as credits available to a given bus queue are shown. Integrated circuit 300*a* includes queue manager circuits 305*a* and 305*b* (collectively 305). Each of queue manager circuits 305 includes three count values (count values 325*a*-325*c* in queue manager circuit 305*a*, and count values 325*d*-325*f* in queue manager circuit 305*b*, collectively referred to as count values 325), as well as respective total credit counts 324*a* and 324*b*, and respective queue front credits 326*a* and 326*b*. Integrated circuit 300*b* includes arbitration circuit 340. As illustrated, integrated circuit 300*b* depicts an embodiment in which similar count and credit information is tracked within an arbitration circuit rather than (or in some embodiments, in addition to) queue manager circuits.

As described above, an arbitration circuit may use a least-recently granted technique for selecting a request from a plurality of bus queues when more than one bus queue has an eligible request at the front. When two or more bus queues have respective requests at the front of the queues, the least-recently granted technique includes selecting a request from the bus queue that has not been selected for the longer amount of time. Such a techniques may help prevent a single processing circuit from monopolizing use of the communication bus. To enable a least-recently used technique, a respective count value for each bus queue may be tracked. In integrated circuit 300*a*, queue manager circuits 305 track a respective count value 325 for each bus queue managed by the respective queue managed by the corresponding one of queue manager circuits 305. As shown, each of queue manager circuits 305 tracks three respective count values 325, indicating that each of queue manager circuits 305 manages three bus queues. In integrated circuit 300*b*, count values 325 are tracked within arbitration circuit 340 instead of in the respective queue manager circuits 305.

It is contemplated that, in some embodiments, count values may be tracked within both queue manager circuits and arbitration circuits.

As illustrated, arbitration circuit 340 is configured, in response to selecting particular memory request from the particular bus queue, to reset a count value associated with the particular bus queue, and to adjust a respective count value for one or more of other bus queues in the plurality of bus queues. Referring to FIG. 1, for example, queue manager circuit 105 may correspond to queue manager circuit 305a. Count values 325a, 325b, and 325c, accordingly, may correspond to bus queues 110a, 110b, and 110c, respectively. After selecting request 150a from bus queue 110a, count value 325a may be reset to an initial value to indicate a request was just selected from bus queue 110a, while count values 325b-325f are adjusted in response to the corresponding bus queues not being selected. In some embodiments, count values 325 may be reset to zero and adjusted by incrementing when the corresponding bus queue is not selected. In such an embodiment, count values 325 may indicate a number of bus cycles since the last time the corresponding bus queue was selected to provide a request. In other embodiments, however, count values may be reset to a non-zero initial value and then incremented or decremented for bus cycles in which the corresponding bus queue is not selected.

As shown in integrated circuit 300a, queue manager circuits 305 may reset and adjust count values 325 corresponding to the bus queues managed by the respective queue manager circuit. After request 150a is selected, queue manager circuit 305a resets count value 325a and adjusts count values 325b and 325c. Queue manager circuit 305b adjust all three of count values 325d-325f. In other embodiments, such as integrated circuit 300b, arbitration circuit 340 is configured to track count values 325 for the bus queues in both queue manager circuits 305a and 305b. Accordingly, arbitration circuit 340 is configured, in response to selecting request 150a from bus queue 110a, to initialize count value 325a and to adjust count values 325b-325f for the other bus queues. For the subsequent bus cycle, requests 150b and 150c are eligible to be selected. Arbitration circuit 340 is further configured to select request 150b to transfer via the communication bus circuit based on count values 325b and 325c. If count values 325 indicate, e.g., a number of bus cycles since a respective bus queue was selected, then count value 325b may be compared to count value 325c. As shown, request 150b is selected from bus queue 110c based on count value 325c (corresponding to bus queue 110c) being higher than count value 325b (corresponding to bus queue 110b).

FIG. 3 further illustrates another technique for selecting between bus queues. Instead of, or in addition to, using a least-recently granted technique, arbitration circuit 340 may be further configured to use a credit-based technique. As depicted, arbitration circuit 340 is configured to allot credits to a plurality of memory request sources, including queue manager circuits 305a and 305b. When a request is selected from a bus queue managed by a particular queue manager circuit (e.g., queue manager circuit 305a), then one or more credits are deducted from total credits 324a. Arbitration circuit 340 is further configured to determine that request 150a is eligible in response to a determination that queue manager circuit 305a has a requisite number of credits in total credits 324a.

In a similar manner as described for count values 325, total credits 324a and 324b may be tracked by the respective queue manager circuits 305 (as in integrated circuit 300a) or by arbitration circuit 340 (as in integrated circuit 300b). Integrated circuit 300a further includes queue front credits 326a and 326b associated with queue manager circuits 305a and 305b, respectively. In some embodiments, a given queue manager circuit may be capable of allotting a particular number of credits to requests that are currently at the front of the corresponding bus queues. For example, queue front credits 326a may be used to increase a priority for the respective queue manager circuit 305a. If both queue manager circuits 305a and 305b each have a respective bus queue with an eligible request at the front, then a number of credits allotted to each of queue front credits 326a and 326b may be compared and the bus queue associated with the larger number of credits is selected. In some embodiments, if the numbers match, then a least-recently granted or round robin technique may be used as a secondary selection criterion.

It is noted that the integrated circuits depicted in FIG. 3 are merely examples to demonstrate the disclosed concepts. Although two queue manager circuits are shown, in other embodiments, any suitable number of queue manager circuits may be included. In addition, although three count values are shown for each queue manager circuit, any suitable number of count values may be included for each queue manager circuit, and various queue manager circuits may include a different number of count values than other queue manager circuits in a same integrated circuit.

To summarize, various embodiments of an integrated circuit that uses an arbitration circuit to select memory requests to transfer from one or more processing circuits to a memory circuit via a communication bus circuit are disclosed. Broadly speaking, apparatus, systems, and methods are contemplated in which an embodiment of an apparatus, for example, includes a communication bus circuit, a memory circuit coupled to the communication bus circuit, a queue manager circuit including a plurality of bus queues, and an arbitration circuit. The communication bus circuit includes a command bus and a data bus separate from the command bus. The queue manager circuit may be configured to receive a first memory request and a second memory request, each request including a respective address value to be sent via the command bus. The first, but not the second, memory request may include a corresponding data operand to be sent via the data bus. The queue manager circuit may also be configured to distribute the first memory request and the second memory request among the plurality of bus queues. Distribution of the first and second memory requests may be based on the respective address values. The arbitration circuit may be configured to select, based on whether the data bus is available, a particular memory request from a particular one of the plurality of bus queues.

In a further example, to distribute the plurality of memory requests, the queue manager circuit may be further configured to generate, for the first memory request, a hash code of the respective address value, and to select one of the plurality of bus queues using the respective hash code. In an example, to select the particular memory request, the arbitration circuit may be configured to identify a set of memory requests. A given memory request of the set may be at the front of a respective one of the plurality of bus queues and is currently eligible to use the communication bus circuit. The arbitration circuit may also be configured to select the particular memory request from the set of memory requests.

In another example, the arbitration circuit may be further configured to determine that the first memory request is eligible based on a determination that the first memory request includes the corresponding data operand to send on the data bus, and the data bus is available to send at least a portion of the corresponding data operand in a next bus cycle. In an example, the arbitration circuit may be further configured to allot credits to a plurality of memory request sources, including the queue manager circuit. In response to a determination that the queue manager circuit has a requisite number of credits, the arbitration circuit may be further configured to determine that the first memory request is eligible.

In a further example, the arbitration circuit may be further configured, in response to selecting the particular memory request from the particular bus queue, to reset a count value associated with the particular bus queue, and to adjust a respective count value for one or more of other bus queues in the plurality of bus queues. In another example, the apparatus may further include a different circuit block, coupled to the communication bus circuit, including a different plurality of bus queues, and a different queue manager circuit configured to distribute a different plurality of memory requests among the different plurality of bus queues. The arbitration circuit may be further configured, in response to selecting the particular memory request from the particular bus queue, to adjust a respective count value for one or more of the different plurality of bus queues.

In an example, the arbitration circuit may be further configured to select a different memory request from a given bus queue of the different plurality of bus queues. To perform the selection of the different memory request, the arbitration circuit may be configured to select, based on the respective count values, the given bus queue, and to determine that the different memory request at the front of the given bus queue includes a data operand to send on the data bus. Furthermore, the arbitration circuit may be configured to determine that the data bus is available to send at least a portion of the data operand in a next bus cycle.

The circuits and techniques described above in regards to FIGS. 1-3 may be performed using a variety of methods. Three methods associated with selecting memory requests to send via a communication bus are described below in regards to FIGS. 4-6.

Turning now to FIG. 4, a flow diagram for an embodiment of a method for selecting a request to send from a plurality of bus queues is illustrated. Method 400 may be used in conjunction with any of the computer circuitry, systems, devices, elements, or components disclosed herein, such as integrated circuits 100, 200, 300a, and 300b of FIGS. 1-3. Method 400 is described below using integrated circuit 100 of FIG. 1 as an example. References to elements in FIG. 1 are included as non-limiting examples.

As illustrated, method 400 begins in block 410 by receiving, by a queue manager circuit in a particular circuit block of a plurality of circuit blocks in an integrated circuit, a first memory request and a second memory request to be sent via a communications bus circuit that includes a command bus and a data bus, separate from the command bus. The first and second memory requests each include a respective address to be sent via the command bus, while the first, but not the second, memory request includes a data operand to be sent via the data bus. For example, queue manager circuit 105 in FIG. 1 receives requests 150a-150f from processing circuit 120 to send via communication bus circuit 130. Both of requests 150a and 150b include respective addresses 152a and 152b. Request 150a, however, includes a data operand (data 154a) while request 150b does not. In some embodiments, request 150a may be a memory request to store data 154a in memory circuit 170 at a location indicated by address 152a. Request 150b may be a request to read information stored in memory circuit 170 at address 152b. As a read, request 150b may not include a data operand.

Method 400 continues at block 420 by selecting, by the queue manager circuit using the address of the first memory request, a particular one of a plurality of bus queues in the particular circuit block to store the first memory request. In the example of FIG. 1, request 150a is placed into bus queue 110a. Selecting bus queue 110a may include queue manager circuit 105 reading address 152a and selecting bus queue 110a based on one or more characteristics of address 152a. For example, valid ranges for addresses may be mapped to one of bus queues 110a-110c. In other embodiments, a hash algorithm (e.g., hash algorithm 280a in FIG. 2) may be used to generate a value from all or a portion of address 152a. The resulting hash code 285a may then be used to select bus queue 110a.

At block 430, method 400 continues by selecting, by an arbitration circuit based on a determination that the data bus is available, the first memory request from the particular bus queue. As shown in FIG. 1 and described above, request 150a includes data 154a and, therefore, is eligible to be selected as a next request to send via communication bus circuit 130 if data bus 134 is available in a next bus cycle. To increase efficiency of communication bus circuit 130, when data bus 134 is available, requests with data operands may be prioritized over requests without data operands.

Method 400 further continues at block 440 by sending, by the queue manager circuit in a first bus cycle, the address of the first memory request via the command bus and at least a portion of the data operand via the data bus. As shown, a command portion of request 150a, including address 152a, is sent to memory circuit 170 via command bus 132 while at least a first portion of data 154a is sent via data bus 134 during bus cycle 136. A remaining portion of data 154a is sent in a subsequent bus cycle, making data bus 134 unavailable in the subsequent bus cycle.

It is noted that the method of FIG. 4 includes blocks 410-440. Method 400 may end in block 440 or may repeat some or all blocks of the method. For example, method 400 may return to block 410 to collect a next set of temperature samples from the subset of temperature sensor circuits. In some cases, method 400, or a portion thereof, may be performed concurrently with other instantiations of the method. For example, integrated circuit 200 in FIG. 2 may perform a first instance of blocks 410 and 420 to distribute requests 250 among bus queues 210a and 210b while performing a different instance of blocks 410 and 420 to distribute requests 260 among bus queues 210c and 210d. Arbitration circuit 240 may perform blocks 430 and 440 to select a next request from bus queues 210a-210d.

Proceeding now to FIG. 5, a flow diagram for an embodiment of a method for selecting a request to send is illustrated. Similar to method 400, method 500 may be used in conjunction with any of the computer circuitry, systems, devices, elements, or components disclosed herein, such as integrated circuits 100, 200, 300a and 300b. Method 500 is described below using integrated circuit 100 of FIG. 1 as an example. References to elements in FIG. 1 are included as non-limiting examples. All or a portion of the blocks of method 500 may be performed as part of performing block 430 of method 400.

As shown, method 500 begins in block 510 by identifying a set of memory requests, wherein a given memory request of the set is at a front of a respective bus queue. For example, after requests have been distributed among bus queues 110, arbitration circuit 140 identifies a set of requests by identifying a respective request that is at the front of each of bus queues 110. At one point in time, this set may include requests 150a-150c.

At block 520, method 500 continues by removing an ineligible memory request from the set in response to determining that the ineligible memory request includes a data operand and that the data bus is unavailable in a next bus cycle. For example, within the set identified in block 510, only request 150a includes a data operand requiring use of data bus 134. If data bus 134 is not available in a next bus cycle, then arbitration circuit 140 may remove request 150a from consideration for selection. Request 150a, however, is not moved from or modified in bus queue 110a and, therefore, may be considered for selection in a subsequent bus cycle.

Method 500 further proceeds at block 530 by selecting, from the remaining queued memory requests of the set, the next memory request. Arbitration circuit 140, for example, considers the remaining requests 150b and 150c for selection after request 150a is removed from consideration. Using one or more selection techniques disclosed above, arbitration circuit 140 is further configured to select either request 150b or 150c.

It is noted that method 500 includes blocks 510-530. Method 500 may end in block 530 or may repeat some or all blocks of the method. For example, method 500 may return to block 510 to select a request for a subsequent bus cycle. In a manner as described above for method 400, method 500 may be performed concurrently with other instantiations of itself and/or method 400. For example, one or more instances of method 400 may be performed to distribute requests to bus queues while an instance of method 500 is performed to select a request to send via the communications bus.

Moving to FIG. 6, a flow diagram for an embodiment of a method for implementing a least-recently used technique for selecting a request is illustrated. Similar to methods 400 and 500, method 600 may be used in conjunction with any of the systems disclosed herein including, for example, integrated circuits 100, 200, 300a and 300b. Method 600 is described below using integrated circuit 300b in FIG. 3 as an example. References to elements in FIG. 3 are included as non-limiting examples. All or a portion of the blocks of method 600 may be performed during or after performance of blocks 430 and/or 440 of method 400.

As depicted, method 600 begins in block 610, in response to selecting the first memory request from the particular bus queue, by initializing a count value associated with the particular bus queue. For example, count values 325a-325c may be associated with bus queues 110a-110c in FIG. 1, respectively, while count values 325d-325f are associated with bus queues in a different processing circuit in integrated circuit 300b. In response to selecting request 150a from bus queue 110a, count value 325a may be initialized to zero or a different initial value, thereby indicating that bus queue 110a has been selected to provide a most recent request to send via communication bus circuit 130.

Method 600 continues at block 620, in response to selecting the first memory request from the particular bus queue, by adjusting respective count values for one or more other bus queues in the plurality of bus queues. For example, count values 325b-325f, associated with bus queues other than bus queue 110a, may be adjusted as an indication that the associated bus queues were not selected. Count values 325b-325f may, in some embodiments, indicate a number of bus cycles for which the associated bus queues have not been selected.

At block 630, method 600 further continues by selecting, after the respective count values have been adjusted, a particular memory request from a given one of the one or more other bus queues using the respective count values. In a subsequent bus cycle, for example, arbitration circuit 340 (e.g., as a part of block 530 of method 400) may identify a plurality of eligible requests for selection. Selection of a given one of the plurality of requests may include comparing count values 325 to one another to identify a least-recently granted bus queue. For example, the count value that has the highest value may be associated with the bus queue that has gone the most bus cycles without having been selected to provide a request.

It is noted that method 600 includes blocks 610-630. Method 600 may end in block 630 or may repeat some or all blocks of the method. For example, method 600 may return to block 610 to initialize the count value associated with the bus queue that was just selected. In a manner as described above for methods 400 and 500, method 600 may be performed concurrently with other instantiations of itself and/or methods 400 and/or 500. For example, one or more instances of method 400 may be performed to distribute requests to bus queues while an instance of method 600 is performed to update count values while a selected request is sent in block 440.

Figure 7:
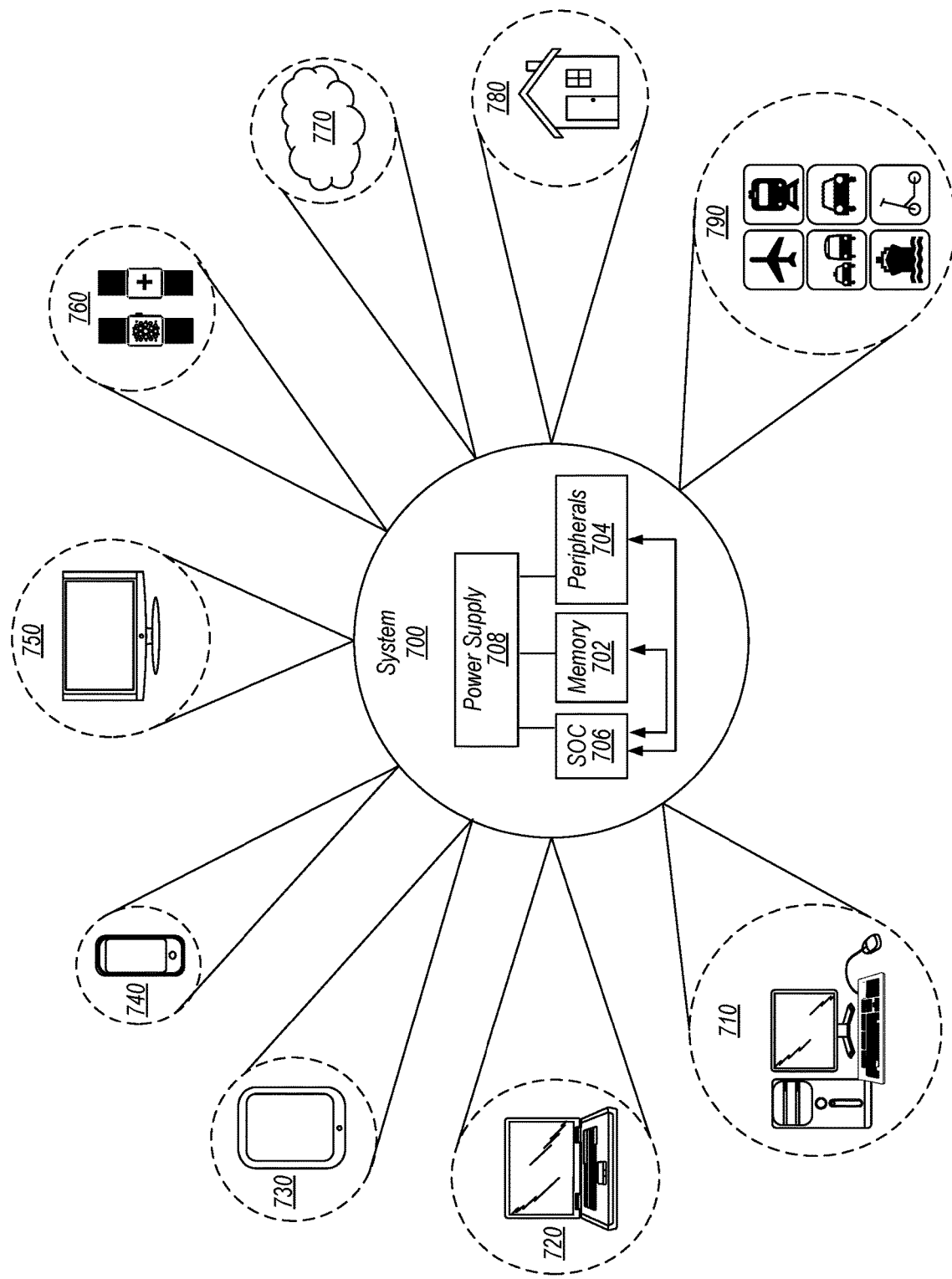
FIG. 7 shows various embodiments of systems that include integrated circuits that utilize the disclosed techniques.

FIGS. 1-6 illustrate circuits and methods for a system, such as an integrated circuit, that includes a temperature sensor circuits for estimating temperatures of various circuit blocks in the integrated circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 700 is illustrated in FIG. 7. SoC 706 may, in some embodiments, include any disclosed embodiment of integrated circuits 100, 200, 300a, and 300b in FIGS. 1-3.

In the illustrated embodiment, the system 700 includes at least one instance of a system on chip (SoC) 706 which may include multiple types of processor circuits, such as a central processing unit (CPU), a graphics processing unit (GPU), or otherwise, a communication fabric, and interfaces to memories and input/output devices. One or more of these processor circuits may correspond to an instance of the processor cores disclosed herein. In various embodiments, SoC 706 is coupled to external memory circuit 702, peripherals 704, and power supply 708.

A power supply 708 is also provided which supplies the supply voltages to SoC 706 as well as one or more supply voltages to external memory circuit 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory circuit 702 is included as well).

External memory circuit 702 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 702 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration. In some embodiments, external memory circuit 702 may correspond to memory circuit 170 or 270 in FIGS. 1 and 2.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 760 are contemplated as well, such as devices worn around the neck, devices attached to hats or other headgear, devices that are implantable in the human body, eyeglasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise.

It is noted that the wide variety of potential applications for system 700 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 7 are illustrative only and are not intended to be limiting. Other devices are possible and are contemplated.

As disclosed in regards to FIG. 7, computer system 700 may include one or more integrated circuits included within a personal computer, smart phone, tablet computer, or other type of computing device. A process for designing and producing an integrated circuit using design information is presented below in FIG. 8.

Figure 8:
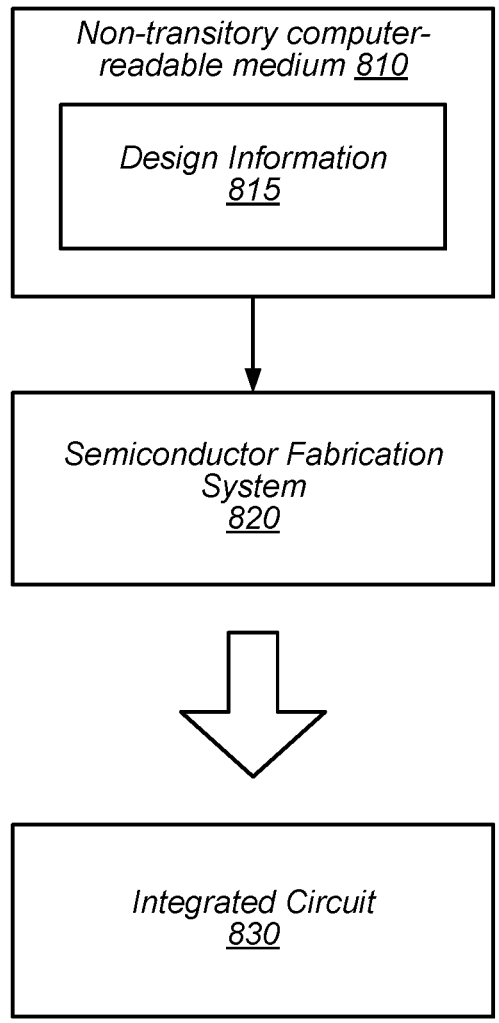
FIG. 8 is a block diagram of an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, for example, including one or more instances of integrated circuits 100, 200, 300a, and 300b shown in FIGS. 1-3. In the illustrated embodiment, semiconductor fabrication system 820 is configured to process the design information 815 stored on non-transitory computer-readable storage medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
    a communication bus circuit including a command bus and a data bus separate from the command bus;
    a memory circuit coupled to the communication bus circuit;
    a queue manager circuit, coupled to the communication bus circuit, including a plurality of bus queues, and configured to:
        receive a first memory request and a second memory request, each including a respective address value to be sent via the command bus, wherein the first, but not the second, memory request includes a corresponding data operand to be sent via the data bus; and
        distribute the first memory request and the second memory request among the plurality of bus queues, wherein distribution of the first and second memory requests is based on the respective address values; and
    an arbitration circuit configured to select, based on whether the data bus is available, a particular memory request from a particular one of the plurality of bus queues, wherein to select the particular memory request, the arbitration circuit is further configured to select the second memory request based at least on a determination that the data bus is not available.

2. The apparatus of claim 1, wherein to distribute the first and second memory requests, the queue manager circuit is further configured to:
    generate, for the first memory request, a hash code of the respective address value; and
    select one of the plurality of bus queues using the hash code.

3. The apparatus of claim 1, wherein to select the particular memory request, the arbitration circuit is configured to:
    identify a set of memory requests, wherein a given memory request of the set is at a front of a respective one of the plurality of bus queues and is currently eligible to use the communication bus circuit; and
    select the particular memory request from the set of memory requests.

4. The apparatus of claim 3, wherein the arbitration circuit is further configured to determine that the first memory request is eligible based on a determination that:
    the first memory request includes the corresponding data operand to send on the data bus; and
    the data bus is available to send at least a portion of the corresponding data operand in a next bus cycle.

5. The apparatus of claim 3, wherein the arbitration circuit is further configured to:
    allot credits to a plurality of memory request sources, including the queue manager circuit; and
    in response to a determination that the queue manager circuit has a requisite number of credits, determine that the first memory request is eligible.

6. The apparatus of claim 1, wherein the arbitration circuit is further configured, in response to selecting the particular memory request from the particular bus queue, to:
    reset a count value associated with the particular bus queue; and
    adjust a respective count value for one or more of other bus queues in the plurality of bus queues.

7. The apparatus of claim 6, further comprising a different circuit block, coupled to the communication bus circuit, including:
    a different plurality of bus queues; and
    a different queue manager circuit configured to distribute a different plurality of memory requests among the different plurality of bus queues; and
    wherein the arbitration circuit is further configured, in response to selecting the particular memory request from the particular bus queue, to adjust a respective count value for one or more of the different plurality of bus queues.

8. The apparatus of claim 7, wherein the arbitration circuit is further configured to select a different memory request from a given bus queue of the different plurality of bus queues, wherein to perform the selection of the different memory request, the arbitration circuit is configured to:
  select, based on the respective count values, the given bus queue;
  determine that the different memory request at a front of the given bus queue includes a data operand to send on the data bus; and
  determine that the data bus is available to send at least a portion of the data operand in a next bus cycle.

9. A method comprising:
  receiving, by a queue manager circuit in a particular circuit block of a plurality of circuit blocks in an integrated circuit, a first memory request and a second memory request to be sent via a communications bus circuit that includes a command bus and a data bus, separate from the command bus, wherein the first and second memory requests each include a respective address to be sent via the command bus, and wherein the first, but not the second, memory request includes a data operand to be sent via the data bus;
  selecting, by the queue manager circuit using the respective address of the first memory request, a particular one of a plurality of bus queues in the particular circuit block to store the first memory request;
  selecting, by the queue manager circuit using the respective address of the second memory request, a different one of the plurality of bus queues to store the second memory request;
  selecting, by an arbitration circuit based on a determination that the data bus is available, the first memory request from the particular bus queue;
  sending, by the queue manager circuit in a first bus cycle, the respective address of the first memory request via the command bus and at least a portion of the data operand via the data bus; and
  selecting, by the arbitration circuit based on a determination that the data bus is not available, the second memory request from the different bus queue.

10. The method of claim 9, selecting, by the queue manager circuit using the respective address of the second memory request, a different one of the plurality of bus queues in the particular circuit block to store the second memory request.

11. The method of claim 9, wherein selecting a given bus queue to store a given memory requests includes:
  generating a hash code of a respective address value in the given memory request; and
  selecting the given bus queue from the plurality of bus queues using the hash code.

12. The method of claim 9, wherein selecting a given memory requests includes:
  identifying a set of memory requests, wherein a given memory request of the set is at a front of a respective bus queue; and
  removing an ineligible memory request from the set in response to determining that the ineligible memory request includes a data operand and that the data bus is unavailable in a next bus cycle.

13. The method of claim 9, further comprising, in response to selecting the first memory request from the particular bus queue:
  initializing a count value associated with the particular bus queue; and
  adjusting respective count values for one or more other bus queues in the plurality of bus queues.

14. The method of claim 13, further comprising selecting, after the respective count values have been adjusted, a particular memory request from a given one of the one or more other bus queues using the respective count values.

15. A system comprising:
  a communication bus circuit including a command bus and a data bus separate from the command bus;
  a memory circuit coupled to the communication bus circuit;
  a plurality of queue manager circuits coupled to the communication bus circuit, wherein a particular queue manager circuit includes a plurality of bus queues configured to hold a plurality of memory requests to be sent via the communication bus circuit, and wherein the particular queue manager circuit is configured to:
    receive a first memory request and a second memory request, each including a respective address value to be sent via the command bus, wherein the first, but not the second, memory request includes a corresponding data operand to be sent via the data bus; and
    assign the first and second memory requests to respective ones of the plurality of bus queues, wherein assignments of the first and second memory requests are based on the respective address values; and
  an arbitration circuit configured to select, from the plurality of queue manager circuits, a next memory request to transfer via the communication bus circuit, wherein to select the next memory request, the arbitration circuit is further configured to select the second memory request based at least on a determination that the data bus is not available.

16. The system of claim 15, wherein to assign the first and second memory requests to the respective ones of the plurality of bus queues, the particular queue manager circuit is further configured to:
  select a first bus queue for the first memory request using a destination address of a first memory location of the memory circuit to which at least a portion of the corresponding data operand is to be written; and
  select a second bus queue for the second memory request using a source address of a second memory location of the memory circuit from which information is to be read.

17. The system of claim 15, wherein other queue manager circuits of the plurality of queue manager circuits include one or more respective bus queues; and
  wherein the arbitration circuit is further configured to track respective count values for the bus queues in the plurality of queue manager circuits.

18. The system of claim 17, wherein the arbitration circuit is further configured to:
  initialize a count value corresponding to a bus queue from which a memory request is selected;
  adjust respective count values corresponding to the other bus queues in the plurality of queue manager circuits; and
  select a subsequent memory request to transfer via the communication bus circuit based on the tracked count values.

19. The system of claim 15, wherein to select the next memory request to transfer, the arbitration circuit is further configured to:

identify a set of queued memory requests, wherein a given memory request of the set is at a front of a respective bus queue;

in response to a determination that the data bus is unavailable in a next bus cycle, remove, from the set, ones of the queued memory requests that include a data operand; and select, from remaining queued memory requests of the set, the next memory request.

20. The system of claim 19, wherein the arbitration circuit is further configured, in a subsequent bus cycle, to:

identify a refreshed set of queued memory requests, wherein a given memory request of the refreshed set is at a front of a respective bus queue; and in response to a determination that the data bus is available in a following bus cycle, select one of the queued memory requests in the refreshed set that has a data operand.

\* \* \* \* \*